United States Patent Office 3,465,799
Patented Sept. 9, 1969

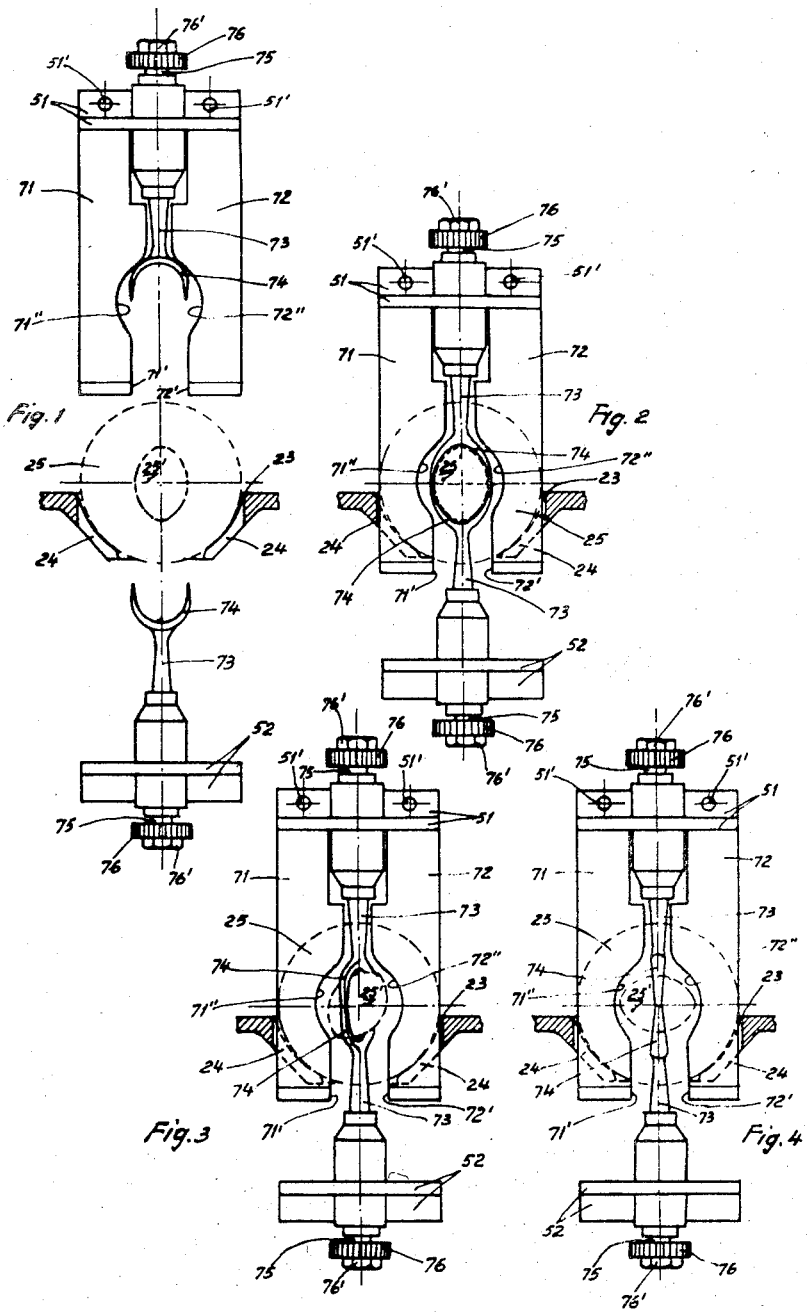

3,465,799
DEVICE FOR REMOVING FRUIT STONES AND CUTTING PEACHES AND SIMILAR FRUITS
Giordano Tomelleri, Via Montorio 22, Verona, Italy
Filed May 16, 1967, Ser. No. 638,873
Int. Cl. A01f *37/14;* A23n *3/00*
U.S. Cl. 146—28                             2 Claims

ABSTRACT OF THE DISCLOSURE

This invention relates to an improvement in a device for use in the canning industry and to the simultaneously cutting and destoning of peaches and similar fruits regardless of whether the fruits are properly oriented without in any way endangering the cutting blades for cutting the fruit and the seed or stone removal blades in their operation.

---

The invention has to do with an improvement in a machine used in the canning industry. In the preparation of fruit such as peaches, it is necessary to cut the peach and remove the stone therefrom. Heretofore, this has been accomplished by two separate machines or in two separate stages of operation. Applicant now has produced a device which will simultaneously cut the fruit and destone the same. Also heretofore, the fruit must be oriented properly in its carrier in order to cut and destone. If it was not properly oriented usually breakage was had of the cutting tools or the destoning tools. In the present device, it is not absolutely necessary that the fruit be properly oriented in order to cut and destone in that such operations may be carried out if the fruit is not properly oriented.

Therefore, it is an object of this invention to provide a mechanism whereby fruit such as peaches or the like are carried between a battery of cutting and destoning blades so that the fruit may be simultaneously cut and destoned.

It is a further object that the cutting and destoning operation can be carried out regardless of whether the fruit is properly oriented in the carrying means.

Other aspects of the invention will appear in the description and mode of operation herein described which is by way of example only and is not limiting to what is hereinafter claimed. A preferred design is shown in the accompanying drawings in which FIG. 1 discloses the fruit being supported in the carrier with the cutting and destoning blades out of the operation and with the fruit properly oriented;

FIG. 2 discloses the cutting and destoning in full operative position within the fruit;

FIG. 3 is a view similar to FIG. 2 but showing the fruit slightly off the proper orientation; and FIG. 4 is also similar to FIG. 2 but showing the fruit 90 degrees off of proper orientation.

Like numerals are used in each of the figures to describe the various parts.

A cavity 23 with an open bottom provided with lateral apertures 24 which permit passage of the destoning blades. Shown in the cavity is a fruit 25 for example a peach having within the body thereof a stone 25' which stone is positioned vertically. In this position, the fruit would have the stem end directly uppermost or positioned 180° from that point to be properly oriented. When properly oriented, the fruit has obtained this orientation because the major axis of the stone 25' coincides with the median vertical axis of the destoning devices.

The cavity 23 is intermittently moved and when at position of rest between the movement plates 51 and 52 are located respectively above and below the cavity and while in this position of rest, the plates are moved toward each other so that the cutting and destoning elements will penetrate into the fruit. Carried by the upper plate 51 by means of fastening elements 51' are two cutting blades 71 and 72 having cutting edges 71' and 72'. Carried between the blades 71 and 72 and which is also carried by the plate 51 is a rod 73 which carries on one end thereof semi-circular cutting member 74 which is destoning knife. The other end of the rod 73 is connected to a shaft 75 which has thereon a pinnion 76 secured thereto by means of a nut 76'. The pinnion 76 is engaged by a rack bar, not shown, which is actuated by any well known driving means to rotate the pinion 76 and in turn rotate the knife 74 to encircle the upper half of the stone so as to remove the same from the flesh of the fruit. The lower plate 52 also has a rod 73 carried thereby and connected to a shaft 75 on which is mounted the pinnon 76 and held thereon by the nuts 76' and is operated in the same manner as the one previously described. The blade 74 on the lower rod 73 when inserted within the fruit will be rotated to cut lower half of the stone from the flesh of the fruit. The two semi-circular blades meet in the horizontal center of the fruit to completely cut away the stone.

The blades 71 and 72 have semi-circular cut outs in their opposed edges at the point where the stoning knives would meet and provide an area in which the stoning knives may be rotated about the stone to remove it from the flesh. The lower edges of the cutting blades, namely 71' and 72' are so positioned that the blades can pass through the fruit to completely cut the fruit on each lateral side of the stone and pass completely through the lateral apertures 24. Also the cutting edges are positioned apart so that the lower stone cutting knife can be forced into the flesh of the fruit between the blades and complete the cut to the point of the stone, but without in any way engaging the blades 71 and 72. The upper stone cutting blade 74 also cuts that area of the peach or fruit at the upper portion thereof which is not cut by the blades 71 and 72. Thus, the fruit is completely cut and destoned in one operation.

When the fruit is not properly oriented in the cavity 23 as shown in FIGS. 3 and 4, the cutting edges 71' and 72' will upon engagement with the stone during their cutting motion into the body of the fruit will tend to rotate the same into a better orientation. Further, during the rotation of the destoning knives 74 they also may engage some portions of the stone and likewise partially rotate the fruit into a better orientation for the purpose of completely cutting the stone from the flesh. The stones during any rotation by the destoning blades 74 do not engage the curvatures 71" and 72" of the blades 71 and 72 because these curvatures have a diametric distance between them which is greater than the maximum diameter of the stone and thus, they cannot in any way hinder the rotation of the blades 74 which might possible break the blades 74.

The fruit may be held in the cavity 23 by means of a hood placed over the upper portion of the fruit, not shown, with the hood having lateral slots therein through which the knives connected to the upper plate 51 will pass in their downward movement to cut the fruit and destone the same.

The cutting blades 71 and 72 and the cutting edges 71' and 72' will pass through the upper portion of the fruit to a point slightly beyond the horizontal axis of the fruit before the upper destoning knife 74 enters the upper surface of the fruit. It is also noted that the lower ends of the blades 71 and 72 are spaced apart a sufficient distance to allow the lower destoning knife 74 in its upward movement to pass between the blades and to complete the cut in the lower portion of the fruit to the stone area where the two destoning blades will meet and then be rotated about the stone to remove the flesh therefrom.

When the fruit is improperly oriented to that position shown in FIG. 4, the destoning knives will engage the stone and will rotate the stone within the fruit whereby the stone is removed from the pulp or flesh without a cutting of the flesh.

Having described by way of example a means for cutting and destoning fruit simultaneously, it is to be understood that this is by way of example only and is not in any way to be considered as limiting upon the scope of the claims hereinafter appended.

I claim:

1. A device for cutting and destoning peaches and similar fruit comprising; a concave support for the fruits, means for cutting and destoning the fruit, said cutting and destoning means comprising; reciprocable blades cutting entirely through the flesh of the fruit and curved blades following the cutting blades, means for rotating the curved blades about the stone to remove the stone from the flesh while the fruit is being held in the supporting surface by the first named cutting blades, said cutting blades comprising a pair of spaced apart blades which pass through the flesh of the fruit and which are spaced apart a sufficient distance which is slightly greater than the maximum diameter of the stone when the fruit is properly oriented in the support, said cutting blades being carried by a support structure, a shaft carried by the support structure between the blades, driven means on the shaft for rotating the same, a substantially semi-circular destoning knife mounted on the shaft being rotatively driven by the driven means, a second supporting means, a shaft carried by the second supporting means, a driven means for driving the second shaft, a substantially semi-circular destoning knife mounted on the second shaft, said supporting members being movable toward each other whereby the cutting blades will cut a fruit and the destoning knives will encircle the fruit stone and will cut the same from the flesh of the fruit.

2. A device for cutting and destoning peaches and similar fruit comprising; a concave support for the fruits, means for cutting and destoning the fruit, said cutting and destoning means comprising; reciprocable blades cutting entirely through the flesh of the fruit and curved blades following the cutting blades, means for rotating the curved blades about the stone to remove the stone from the flesh while the fruit is being held in the supporting surface by the first named cutting blades, cutting blades being spaced apart and carried by a supporting structure, said destoning knife being mounted between the cutting blades and carried by the supporting structure, said destoning knife comprising a substantially semi-circular knife structure, a second supporting structure carrying a second destoning knife, the second destoning knife comprising a substantially semi-circular knife structure, said supporting structures being movable toward each other, the cutting blades during the movement of the supporting structures cutting through the flesh of the fruit and the two destoning knives encircling the stone and cutting the flesh from around the stone, the destoning knives engaging the stone when the fruit is not properly oriented and rotating the stone within the fruit and removing it from the flesh of the fruit.

References Cited

UNITED STATES PATENTS

| 1,334,449 | 3/1920 | Griffin | 146—28 |
| 1,784,999 | 12/1930 | Anderson | 146—28 |
| 2,300,212 | 10/1942 | Farmer | 146—28 |

W. GRAYDON ABERCROMBIE, Primary Examiner